United States Patent [19]

Kishishita

[11] Patent Number: 5,079,913
[45] Date of Patent: Jan. 14, 1992

[54] TURBOCHARGER COMPOUND ENGINE SYSTEM

[75] Inventor: Keiji Kishishita, Yokohama, Japan

[73] Assignee: Isuzu Motors Limited, Tokyo, Japan

[21] Appl. No.: 589,550

[22] Filed: Sep. 28, 1990

[30] Foreign Application Priority Data

Sep. 29, 1989 [JP] Japan .................... 1-254500

[51] Int. Cl.$^5$ .............................. F02B 41/10
[52] U.S. Cl. .......................... 60/597; 60/624
[58] Field of Search ............ 60/597, 598, 624

[56] References Cited

U.S. PATENT DOCUMENTS

| 3,050,932 | 8/1962 | Mueller et al. ............ 60/598 |
| 4,694,654 | 9/1987 | Kawamura ................ 60/597 |

FOREIGN PATENT DOCUMENTS

| 0178270 | 4/1986 | European Pat. Off. . |
| 0225026 | 6/1987 | European Pat. Off. . |
| 0233079 | 8/1987 | European Pat. Off. . |
| 18231 | 1/1984 | Japan .................... 60/597 |
| 135616 | 7/1985 | Japan .................... 60/597 |
| 61-175240 | 8/1986 | Japan . |
| 93430 | 4/1987 | Japan .................... 60/597 |
| 272908 | 11/1988 | Japan .................... 60/597 |
| 1-177419 | 7/1989 | Japan . |

Primary Examiner—Michael Koczo
Attorney, Agent, or Firm—Staas & Halsey

[57] ABSTRACT

A complex turbocharger compound engine system has a clutch disposed between the rotatable shaft of a turbine which is drivable by exhaust gases emitted from an engine and a power transmission device by which the rotatable shaft and the output shaft of the engine are operatively coupled to each other, a generator mounted on the rotatable shaft, and a rotary electric machine operatively coupled to the output shaft of the engine and operable selectively as a generator or as a motor. In a region in which the turbine operates with high efficiency, the region depending on operating conditions of the engine, the clutch is engaged to transmit rotative power of the turbine driven by the exhaust gases to the output shaft of the engine, thereby mechanically recovering the exhaust energy of the engine. In a region in which the turbine operates with low efficiency, the generator is driven by the turbine and the rotary electric machine is operated as a motor by the generated electric power. The exhaust energy of the engine is therefore efficiently recovered depending on the operating conditions of the engine.

2 Claims, 3 Drawing Sheets

TURBOCHARGER COMPOUND ENGINE SYSTEM

BACKGROUND OF THE INVENTION

1. Field of the Invention

The present invention relates to a complex turbocharger compound engine system for recovering the energy of exhaust gases emitted from an engine.

2. Prior Art

There is known an exhaust energy recovery system in which a recovery turbine drivable by exhaust gases is disposed in an exhaust pipe of an engine, and rotative power of the recovery turbine is transmitted through a speed reducer to the output shaft of the engine, so that the energy of exhaust gases is mechanically recovered. According to another proposed system, a generator is driven by such a recovery turbine and electric power generated by the generator is used to rotate a motor coupled to the output shaft of the engine, whereby the exhaust energy is electrically recovered.

Japanese Laid-Open Patent Publication No. 63(1988)-105233 discloses another system which has a fluid clutch disposed between the rotatable shaft of a power turbine, which corresponds to a recovery turbine, and the output shaft of an engine. Depending on the pressure condition of a working fluid supplied to the fluid clutch, the rate of flow of exhaust gases to the power turbine is controlled for thereby controlling the rotational speed of the power turbine depending on the rotational speed of the engine.

The mechanical recovery system, referred to above, can recover the exhaust energy highly efficiently insofar as the engine rotates at a preset rotational speed. However, when the engine rotates at speeds different from the preset rotational speed, the efficiency with which the exhaust energy is recovered is sharply dropped. More specifically, the preset rotational speed is normally selected as a high speed where the exhaust energy is large. When the engine rotates in medium and low speed ranges, the back pressure of the recovery turbine builds up, resulting in a reduction in the efficiency of the recovery turbine. The back pressure buildup increases the resistance to the flow of exhaust gases, so that the output power of the engine is reduced.

The mechanical recovery system and the recovery system disclosed in the above publication are however unable to recover any energy produced when the engine is braked.

The electric recovery system is advantageous in that the efficiency thereof is not affected by changes in the rotational speed of the engine. However, since the exhaust energy is first converted into electric energy and the electric energy is then converted into mechanical energy, the overall recovery efficiency is low owing to energy conversion losses. While the energy produced when the engine is braked can be recovered by the motor which is connected to the output shaft of the engine and which operates a generator, the recovered energy is not sufficient.

SUMMARY OF THE INVENTION

It is an object of the present invention to provide a complex turbocharger compound engine system having a recovery means for mechanically recovering the energy of exhaust gases emitted from an engine and a recovery means for electrically recovering the energy of exhaust gases emitted from the engine, the recovery means being selectively operable depending on operating conditions of the engine for efficient recovery of the exhaust energy of the engine.

Another object of the present invention is to provide a complex turbocharger compound engine system having both mechanical and electric exhaust energy recovery means, the electric exhaust energy recovery means being operable to efficiently recover the energy produced when a motor vehicle with the complex turbocharger compound engine is braked.

According to the present invention, there is provided a complex turbocharger compound engine system comprising an engine adapted to be mounted on a motor vehicle, the engine having an output shaft, a turbine drivable by exhaust gases emitted from the engine, the turbine having a rotatable shaft, a power transmission device operatively interconnecting the rotatable shaft and the output shaft, a generator mounted on the rotatable shaft, a clutch disposed between the rotatable shaft and the power transmission device, a rotary electric machine operatively coupled to the output shaft and operable selectively as a generator and a motor, an engine rotation sensor for detecting a rotational speed of the engine, an engine load sensor for detecting a load on the engine, presetting means for presetting a mechanical exhaust energy recovery region in which the energy of exhaust gases is mechanically recovered and an electric exhaust energy recovery region in which the energy of exhaust gases is electrically recovered, depending the rotational speed of the engine and the load on the engine, determining means for determining an exhaust energy recovery region preset by the presetting means, based on signals from the engine rotation sensor and the engine load sensor, and control means for engaging the clutch when the mechanical exhaust energy recovery region is determined by the determining means, and for disengaging the clutch, operating the generator to generate electric energy, and driving the rotary electric machine as a motor with the generated electric energy when the electric exhaust energy recovery region is determined by the determining means.

According to the present invention, there is also provided a complex turbocharger compound engine system comprising, an engine adapted to be mounted on a motor vehicle, the engine having an output shaft, a turbine drivable by exhaust gases emitted from the engine, the turbine having a rotatable shaft, a power transmission device operatively interconnecting the rotatable shaft and the output shaft, a generator mounted on the rotatable shaft, a clutch disposed between the rotatable shaft and the power transmission device, a rotary electric machine operatively coupled to the output shaft and operable selectively as a generator and a motor, a battery adapted to be mounted on the motor vehicle, a brake sensor for detecting operation of a brake on the motor vehicle, an engine rotation sensor for detecting a rotational speed of the engine, an engine load sensor for detecting a load on the engine, presetting means for presetting a mechanical exhaust energy recovery region in which the energy of exhaust gases is mechanically recovered and an electric exhaust energy recovery region in which the energy of exhaust gases is electrically recovered, depending the rotational speed of the engine and the load on the engine, determining means for determining an exhaust energy recovery region preset by the presetting means, based on signals from the engine rotation sensor and the engine load sensor, first control means for engaging the clutch when the mechanical exhaust energy recovery region is determined by the determining means, and for disengaging the clutch, operating the generator to generate electric energy, and driving the rotary electric machine as a motor with the generated electric energy when the electric exhaust energy recovery region is determined by the determining means, and second control means for engaging the clutch to operate the generator to generate electric energy, operating the rotary electric machine as a generator to generate electric energy, and charging the battery with the generated electric energy from the generator and the rotary electric machine, when the motor vehicle is determined as being braked based on a signal from the brake sensor.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
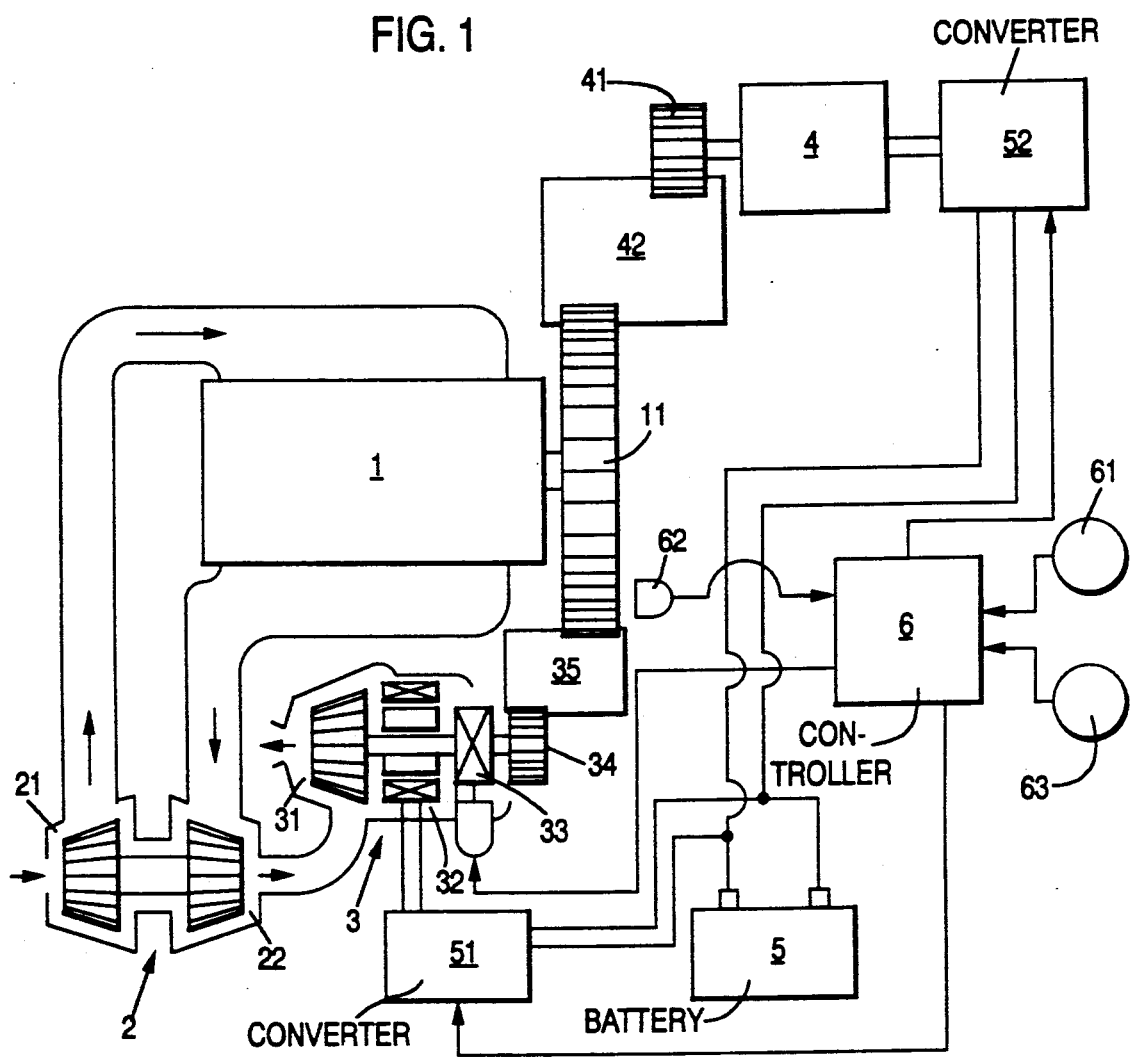
FIG. 1 is a schematic view, partly in block form, of a complex turbocharger compound engine system according to the present invention.

As shown in FIG. 1, a complex turbocharger compound engine system includes an internal combustion engine 1 combined with a turbocharger 2 which has a turbine 22 rotatable by exhaust gases emitted from the engine 1 and a compressor 21 coupled to the turbine 22 for supercharging the engine 1. The engine 1 has an output shaft to which there is connected a flywheel 11 having an external gear on its outer circumference.

Exhaust gases discharged from the turbine 22 are led to a recovery turbine assembly 3. Since the exhaust gases still have a sufficient amount of energy, they rotate a turbine 31 of the recovery turbine assembly 3. The recovery turbine assembly 3 has a rotatable shaft on which a generator 32 is mounted. The rotatable shaft of the recovery turbine assembly 3 is coupled to a gear 34 through an electromagnetic clutch 33. The electromagnetic clutch 33 selectively connects and disconnects the rotatable shaft of the recovery turbine assembly 3 and the gear 34 in response to a signal from a controller 6 (described later).

The gear 34 is operatively connected to the flywheel 11 through a transmission or a speed reducer 35. The flywheel 11 is also connected to a gear 41 mounted on the rotatable shaft of a rotary electric machine 4 through a transmission or a speed reducer 42.

A battery 5 is connected to a converter 51 and a converter 52. The converter 51 serves to control the amount of electric power generated by the generator 32 and rectify the generated electric power to charge the battery 5. The converter 52 serves to control the amount of electric power generated by the rotary electric machine 4, rectify the generated electric power to charge the battery 5, and control the rotational speed of the rotary electric machine 4 which is rotated by electric energy supplied from the battery 5.

The controllers 51, 52 are connected to the controller 6 which supplies the controllers 51, 52 with control signals to control the amount of generated electric power and the rotational speed. To the controller 6, there are also connected the electromagnetic clutch 33, an accelerator pedal movement sensor 61 for detecting the amount of depression of an accelerator pedal (not shown), an engine rotation sensor 62 for detecting the rotational speed of the flywheel 11, and a brake switch 63 for detecting whether a brake pedal (not shown) is depressed or not.

The controller 6 comprises an input/output interface for sending and receiving signals, a ROM for storing relevant data and a program, a CPU for carrying out calculations under the control of the program, a RAM for temporarily storing the results of the calculations and data, and a control memory for controlling the flow of signals in the controller 6.

A map of engine rotational speeds and engine loads, among other data stored in the ROM, will be described below.

Figure 2:
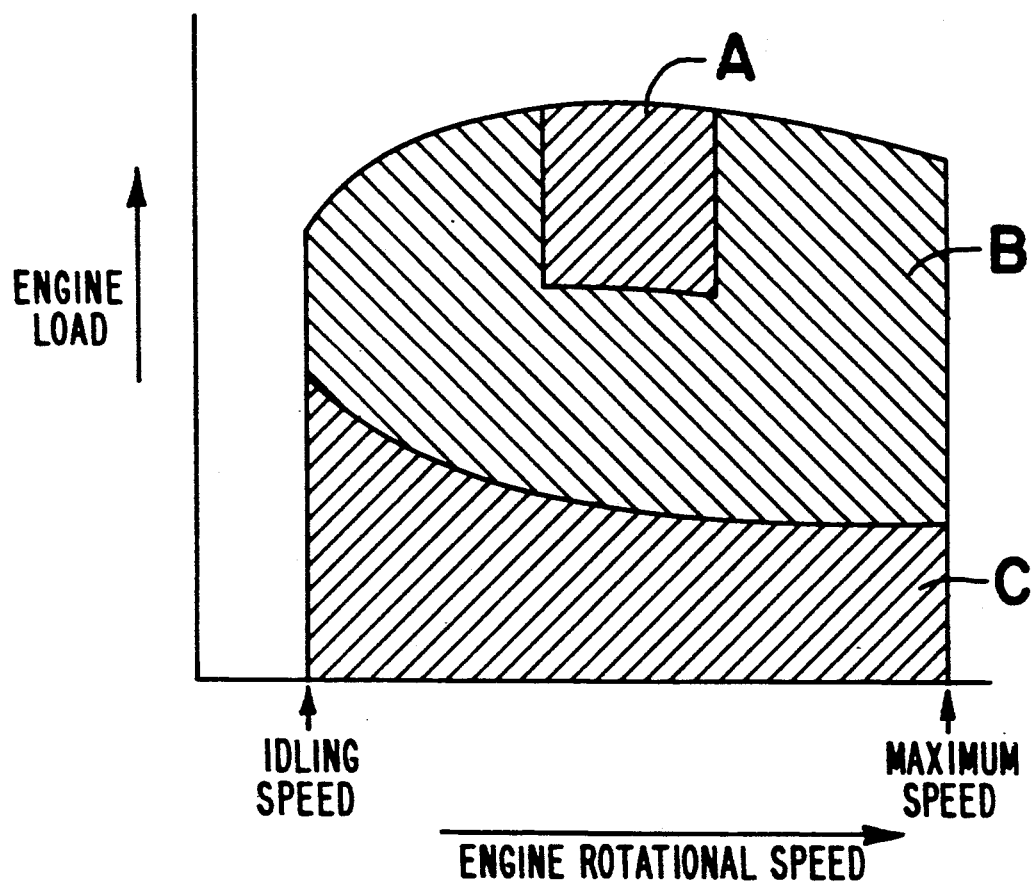
FIG. 2 is a diagram showing an energy energy recovery region depending on the rotational speed of an engine and the load on the engine.

FIG. 2 shows such a map of engine rotational speeds and engine loads.

The graph of FIG. 2 has a horizontal axis representing engine rotational speed and a vertical axis representing engine load. There are three regions determined according to engine load and engine rotational speed which range from an idling rotational speed to a maximum rotational speed.

A region A is a mechanical exhaust energy recovery region in which the turbine 31 of the recovery turbine assembly 31 operates highly efficiently.

A region B is an electric exhaust energy recovery region in which the energy of exhaust gases is sufficient but the efficiency of operation of the turbine 31 is low.

A region C is a region in which the engine is under low load, the energy of exhaust gases is low, and no exhaust energy is recovered.

Figure 3:
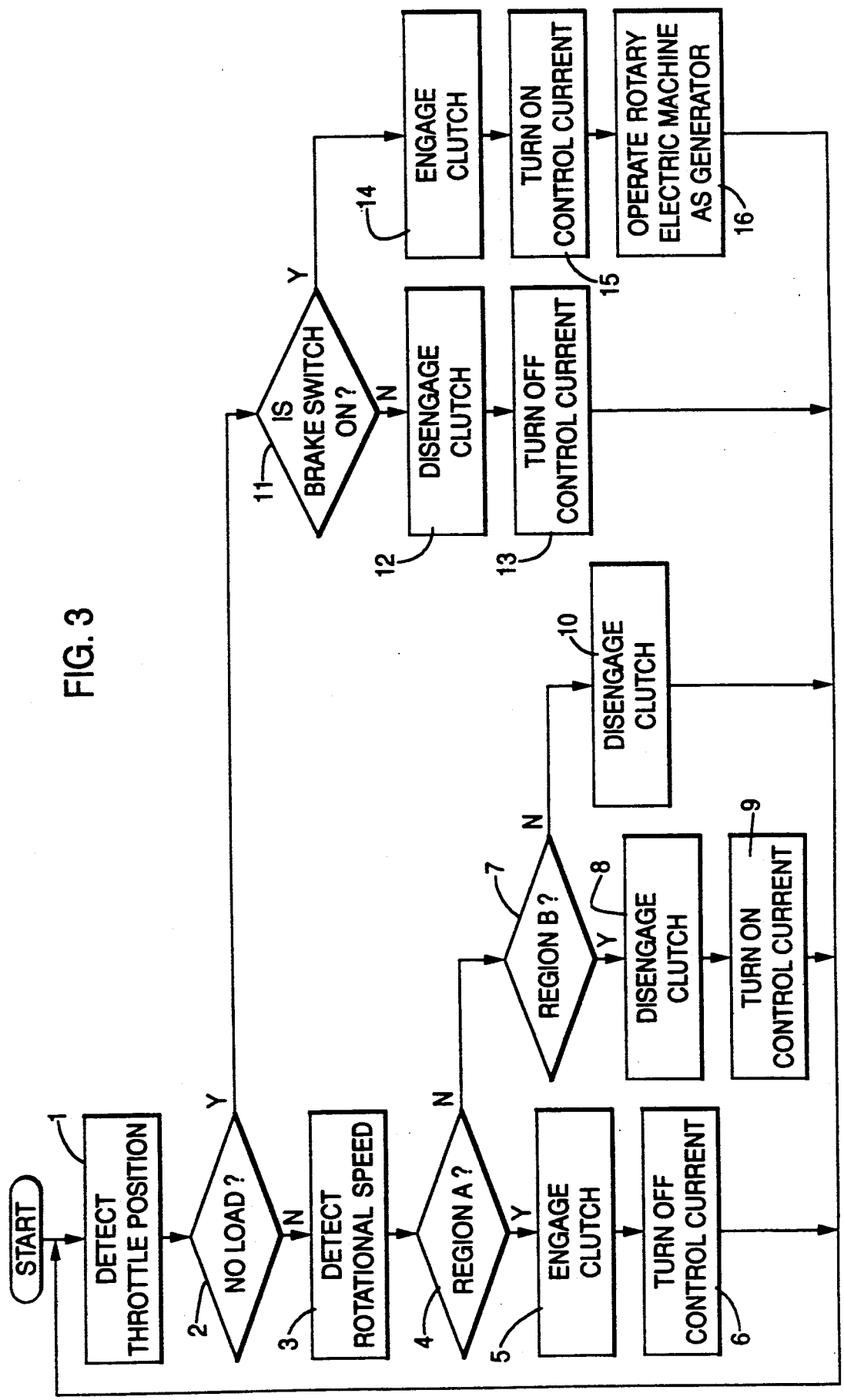
FIG. 3 is a flowchart of an operation sequence of the complex turbocharger compound engine system shown in FIG. 1.

Operation of the complex turbocharger compound engine according to the present invention will be described below with reference to FIG. 3.

In a step (1), the amount of depression of the accelerator pedal, i.e., the load on the engine, is detected according to a signal from the accelerator pedal movement sensor 61. If the accelerator pedal is not depressed, i.e., the engine is under no load, then control goes to a step (11). If the accelerator pedal is depressed, then control proceeds to a step (3).

If the engine is under some load, then the engine rotational speed is detected by the engine rotation sensor 62 in the step (3). Then, the map shown in FIG. 2 is searched for a region in which the engine condition lies based on the engine load detected in the step (1) and the engine rotational speed detected by the engine rotation sensor 62 in the step (3).

If the engine condition is determined as being in the region A in a step (4), then the electromagnetic clutch 33 is engaged in a step (5) to mechanically recovery the energy of exhaust gases emitted from the engine. Then, control currents supplied to the generator 32 and the rotary electric machine 4 are turned off in a step (6), thus preventing the generator 32 from operating as a motor and the rotary electric machine 4 from operating as a generator.

If the engine condition is determined as being in the region B in a step (7), then the electromagnetic clutch 33 is disengaged in a step (8), and the rotary electric machine (4) is operated as a motor by electric power generated by the generator 32 and electric power from the battery 5 in a step (9), thereby assisting in rotating the output shaft of the engine 1.

If the engine condition is determined as falling outside of the region (B) in the step (7), then since the engine condition is in the region C, the electromagnetic clutch 33 is disengaged, and no exhaust gas energy is recovered.

If the engine is determined as being under no load in the step (2), then the brake switch 63 is checked in a step (11). If the brake switch 63 is turned off, then no exhaust gas energy is recovered in steps (12) and (13). If the brake switch 63 is turned on in the step (11), then since the engine is braked, the electromagnetic clutch 33 is engaged in a step (14), regenerated electric power from the generator 32 is recovered in a step (15), and the rotary electric machine 4 is operated as a generator in a step (16), with regenerated electric power recovered.

With the present invention, as described above, when the engine condition is in a region in which the recovery turbine assembly operates with high efficiency, the rotatable shaft of the recovery turbine assembly and the output shaft of the engine are mechanically coupled to each other to recover the energy of exhaust gases. When the engine condition is in a region in which the recovery turbine assembly operates with low efficiency, the rotary electric machine operatively coupled to the output shaft of the engine is driven as a motor by electric power generated by the generator which is driven by the recovery turbine assembly. When the motor vehicle is braked, the braking energy is converted into and recovered as electric energy by the generator coupled to the recovery turbine assembly and the rotary electric machine which operates as a generator.

Although a certain preferred embodiment has been shown and described, it should be understood that many changes and modifications may be made therein without departing from the scope of the appended claims.

What is claimed is:

1. A complex turbocharger compound engine system comprising:
    an engine adapted to be mounted on a motor vehicle, said engine having an output shaft;
    a turbine drivable by exhaust gases emitted from said engine, said turbine having a rotatable shaft;
    a power transmission device operatively interconnecting said rotatable shaft and said output shaft;
    a generator mounted on said rotatable shaft;
    a clutch disposed between said rotatable shaft and said power transmission device;
    a rotary electric machine operatively coupled to said output shaft and operable selectively as a generator or as a motor;
    an engine rotation sensor for detecting a rotational speed of the engine;
    an engine load sensor for detecting a load on said engine;
    presetting means for presetting a mechanical exhaust energy recovery region in which the energy of exhaust gases is mechanically recovered and an electric exhaust energy recovery region in which the energy of exhaust gases is electrically recovered, depending the rotational speed of the engine and the load on the engine;
    determining means for determining an exhaust energy recovery region preset by said presetting means, based on signals from said engine rotation sensor and said engine load sensor; and
    control means for engaging said clutch when the mechanical exhaust energy recovery region is determined by said determining means, and for disengaging said clutch, operating said generator to generate electric energy, and driving said rotary electric machine as a motor with the generated electric energy when the electric exhaust energy recovery region is determined by said determining means.

2. A complex turbocharger compound engine system comprising:
    an engine adapted to be mounted on a motor vehicle, said engine having an output shaft;
    a turbine drivable by exhaust gases emitted from said engine, said turbine having a rotatable shaft;
    a power transmission device operatively interconnecting said rotatable shaft and said output shaft;
    a generator mounted on said rotatable shaft;
    a clutch disposed between said rotatable shaft and said power transmission device;
    a rotary electric machine operatively coupled to said output shaft and operable selectively as a generator or as a motor;
    a battery adapted to be mounted on the motor vehicle;
    a brake sensor for detecting operation of a brake on the motor vehicle;
    an engine rotation sensor for detecting a rotational speed of the engine;
    an engine load sensor for detecting a load on said engine;
    presetting means for presetting a mechanical exhaust energy recovery region in which the energy of exhaust gases is mechanically recovered and an electric exhaust energy recovery region in which the energy of exhaust gases is electrically revoered, depending the rotational speed of the engine and the load on the engine;
    determining means for determining an exhaust energy recovery region preset by said presetting means, based on signals from said engine rotation sensor and said engine load sensor;
    first control means for engaging said clutch when the mechanical exhaust energy recovery region is determined by said determining means, and for disengaging said clutch, operating said generator to generate electric energy, and driving said rotary electric machine as a motor with the generated electric energy when the electric exhaust energy recovery region is determined by said determining means; and
    second control means for engaging said clutch to operate said generator to generate electric energy, operating said rotary electric machine as a generator to generate electric energy, and charging said battery with the generated electric energy from said generator and said rotary electric machine, when the motor vehicle is determined as being braked based on a signal from said brake sensor.

* * * * *